UNITED STATES PATENT OFFICE 2,626,903

PROCESS FOR BREAKING PETROLEUM EMULSIONS

Melvin De Groote, University City, Mo., assignor to Petrolite Corporation, a corporation of Delaware No Drawing. Application December 1, 1950, Serial No. 198,754

9 Claims. (Cl. 252—340)

The present invention is a continuation-in-part of my co-pending application, Serial No. 104,801 filed July 14, 1949 (now Patent 2,552,528, granted May 15, 1951). This invention relates to petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

One object of my invention is to provide a novel process for breaking or resolving emulsions of the kind referred to.

Another object of my invention is to provide an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities, particularly inorganic salts from pipeline oil.

Demulsification as contemplated in the present application includes the preventive step of commingling the demulsifier with the aqueous component which would or might subsequently become either phase of the emulsion, in absence of such precautionary measure. Similarly, such demulsifier may be mixed with the hydrocarbon component.

The demulsifying agent employed in the present process is a fractional ester obtained from a polycarboxy acid and a tetralol, i. e., the chemical compound having 4 alkanol hydroxyls comparable to diols and triols. The particular hydroxylated compound herein employed is obtained by reaction between a polypropylene glycol of comparatively high molecular weight, for example 750–5,000, with two moles of glycide, thus converting a diol into a tetralol.

A polypropylene glycol may be indicated by the following formula:

$$HO(RO)_nH$$

with the proviso that $n$ is a large number sufficient to bring the molecular weight range of the polypropylene glycol within the molecular weight range of 750–5,000.

Incidentally, my preferred range is approximately 1750 to 2750.

If one mole of such diol were etherized with 2 moles of glycerol or, what amounts to the same thing, reacted with 2 moles of glycide, the reaction product, or at least one of the reaction products may be indicated as follows:

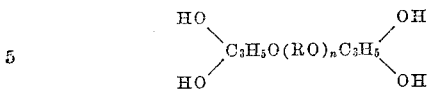

As will be pointed out subsequently and what is obvious is the fact that polypropylene glycol may have two terminal secondary alcohol radicals, or two terminal primary alcohol radicals, or one terminal primary alcohol radical and one terminal secondary alcohol radical. Thus, the previous formula is based on the assumption that reaction takes place at both terminal hydroxyl radicals which may or may not be the case. If reaction takes place at one terminal hydroxyl only then instead of the previous formula the tetralol would presumably be indicated by the following formula:

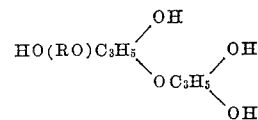

It would be immaterial as to the form of the tetralol and, as a matter of fact it well may be that cogeneric mixtures are obtained. Thus, it is more satisfactory to indicate the tetralol as being of the following composition:

$$R'O(RO)_nR'$$

with the proviso that R' is a radical selected from the monovalent radicals consisting of hydrogen,

and

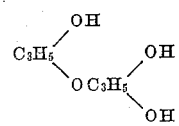

to form a tetralol.

Polypropylene glycols are available from at least two companies. Such polypropylene glycols are furnished in various molecular weight ranges. The water-insoluble, kerosene-soluble polypropylene glycols being in the molecular weight range somewhere above 500, and more specifically, starting at about 700 or 750. The molecular weight was usually determined by the hydroxyl method. Such hydroxyl molecular weight is a fraction, sometimes a large major fraction, of the theoretical molecular weight based on the method of synthesis, i. e., the calculated molecular weight based theoretically on the value one would expect to obtain by treating water or propylene glycol, for example, with propylene oxide. Needless to say, one does not obtain a single compound but a polypropylene glycol of a molecular weight ratio of 750 or 1,000 or 2,000 as the case may be, which really represents a cogeneric mixture whose statistical average molecular weight is the one indicated.

Polypropylene glycols, which are regularly supplied to the trade in volume, include those where the molecular weight runs to 2,000 and beyond. Higher ones are available up to a molecular weight of 3,000 or more. Those of molecular weight of 3,000 to 5,000 can be prepared by conventional means employing substantially the same procedure as produce polypropylene glycols available on the market. In any event those available on the market, for instance, polypropylene glycol 2,000, is substantially in the center of the preferred range (1750–2750) and thus is perhaps the outstanding raw material commercially available for the herein described purpose.

If a polycarboxy acid for convenience is indicated thus:

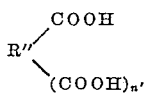

in which $n'$ is a whole number not greater than 2, it becomes obvious that the resultant obtained from treating one mole of the tetralol with 4 moles of a polycarboxy acid may be written thus:

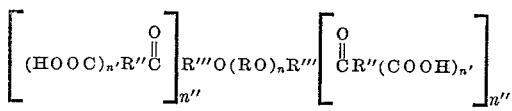

in which all the characters have their previous significance, with the proviso that

is the tetravalent radical obtained, at least hypothetically, by the elimination of the hydroxyl hydrogen atoms from the tetralol $R'O(RO)_nR'$ as previously described, with the proviso that $n''$ represents a whole number varying from one to three and the sum of both occurrences of $n''$ is 4.

It is obvious that minor changes can be made which do not detract from the spirit of the invention, for instance, one could start with a mole of ethylene glycol or mole of diethylene glycol and oxypropylate so as to get a compound which in the strictest sense of the world is not a polypropylene glycol but for all herein mentioned purposes would meet the requirement as to molecular weight range and solubility. Similarly, one could start with butylene glycol and react with a mole of ethylene oxide and then follow by oxypropylation so as to give a product which again in its strictest sense might not be a polypropylene glycol but yet would be within the molecular weight range and show the same solubility characteristics and be entirely satisfactory. For all practical purposes such compounds are considered as polypropylene glycols for the herein described purpose.

Having obtained the tetralol of the kind described the product so obtained is converted into an acidic ester by reacting with a polycarboxy acid so as to introduce one mole of the acid for each hydroxyl radical. This is shown by the above formula. Such esterification is conducted under comparatively mild conditions to prevent polymerizing, i. e., the final product is an acidic ester of the hydroxylated material and not a polyester. For convenience, what is said hereinafter will be divided into five sections:

Part 1 is concerned with the preparation of the tetralol from the selected polypropylene glycol;

Part 2 is concerned with the preparation of the esters from the tetralol;

Part 3 is concerned with the structure of the esterified polyhydroxylated compounds and particularly from the standpoint of the polypropylene glycol itself and its relationship to the ultimate demulsifiers;

Part 4 is concerned with the use of the products herein described as demulsifiers for breaking water-in-oil emulsions, and Part 5 is concerned with certain derivatives which can be obtained from the tetralols. In some instances such tetrahydroxylated compounds can be reacted further and converted into other intermediates which in turn can be reacted further, as for example, by modest oxyethylation, than with the same polycarboxy acids and anhydrides as described in Part 2, to give effective demulsifiers.

PART 1

As previously stated the initial step in the manufacture is to either prepare a polypropylene glycol of roughly 750–5000 molecular weight which is water-insoluble and kerosene-soluble, or else to purchase such material in the open market. My preference is to purchase such material in which the molecular weight is 2,000 or slightly higher. The next step is to convert this diol into a tetralol by treatment with 2 moles of glycide. Needless to say, other reactions can be employed which do not involve glycide as, for example, one can produce ethers of the kind herein employed by use of a glycerol monochlorohydrin, either alpha- or betamonochlorohydrin. Attention is directed to the fact that it would be immaterial as to whether a derivative were obtained from the alpha- or beta- glycerolmonochlorohydrin. Similarly, a similar isomeric difference can occur depending on how the epoxy ring is ruptured in the case of glycide. Other suitable procedures involve the use of epichlorohydrin in the conventional manner. In some instances this would involve an intermediate step of converting the diol into an alkoxide. Other procedures would involve the use of epichlorohydrin with the resultant product treated with caustic soda so as to reform the epoxy ring. The epoxide so obtained could then be treated with water to yield a compound having more than one hydroxyl radical, at least, one of the two initial terminal hydroxyls attached to the polypropylene glycol.

Attention is directed to the fact that the use of glycide requires extreme caution. This is particularly true on any scale other than small laboratory or semi-pilot plant operations. Purely from the standpoint of safety in the handling of glycide, attention is directed to the following: (a) If prepared from glycerol monochlorohydrin, this product should be comparatively pure; (b) the glycide itself should be as pure as possible as the effect of impurities is difficult to evaluate; (c) the glycide should be introduced carefully and precaution should be taken that it reacts as promptly as introduced, i. e., that no excess of glycide is allowed to accumulate; (d) all necessary precaution should be taken that glycide cannot polymerize per se; (e) due to the high boiling point of glycide one can readily employ a typical separatable glass resin pot as described in U. S. Patent No. 2,499,370, dated March 7, 1950, to De Groote and Keiser, and offered for sale by numerous laboratory supply houses. If such arrangement is used to prepare laboratory-scale duplications, then care should be taken that the heating mantle can be removed rapidly so as to allow for cooling; or better still, through an added opening at the top, the glass resin pot or comparable vessel should be equipped with a stainless steel cooling coil so that the pot can be cooled more rapidly than by mere removal of mantle. If a stainless steel coil is introduced it means that conventional stirrer of the paddle type is changed into the centrifugal type which causes the fluid or reactants to mix due to swirling action in the center of the pot. Still better, is the use of a laboratory autoclave of the kind offered for sale by a number of laboratory supply houses; but in any event, when the initial amount of glycide is added to a suitable reactant, such as a polypropylene glycol of the kind described preceding, the speed of reaction should be controlled by the usual factors, such as (a) the addition of glycide; (b) the elimination of external heat; and (c) the use of cooling coil so there is no undue rise in temperature. All the foregoing is merely conventional but is included due to the hazard in handling glycide.

*Example 1a*

The equipment used was a glass pot of the kind above described. This particular pot had a capacity of about 1500 ml. The polypropylene glycol selected was a commercial product described as polypropylene glycol 2025. This value was the same as the molecular weight based on the hydroxyl value. The ratio of glycide to diol is obviously 2 to 1 to produce a tetralol. The amount of polypropylene glycol taken was one-half of a gram mole, i. e., 1015 grams. This was reacted with one gram mole of glycide (74 grams). The procedure was as follows: The polypropylene glycol was charged into the reaction vessel along with 1% (10.5 grams) of sodium methylate. The mixture was stirred and the temperature raised to about 120° C. The glycide was introduced dropwise into the reaction mixture with constant stirring at a comparatively low rate, i. e., about 15 grams per hour. The entire reaction required approximately 5 hours. The temperature during the reaction was allowed to rise to 130° C. At any time it tended to go higher it was cooled in an appropriate manner. If the temperature tended to drop below 112° to 115° C., the reaction mass was heated. When all the glycide had been added the reaction mass was stirred for approximately an hour longer at 130° C. and then heated to a temperature below the decomposition point of glycide, for instance, 140° C., and held at this higher temperature for another hour. In this particular reaction there was comparatively little hazard due to the small amounts of glycide involved. Even so, such oxyalkylation should be conducted with extreme care.

*Example 2a*

The same procedure was employed except that a polypropylene glycol having a molecular weight of 1750 was substituted for the product used in Example 1a. This meant the use of 875 grams of polypropylene glycol and 9 grams of sodium methylate as a catalyst. The amount of glycide employed was identical to that in Example 1a, and the rate of addition was the same. The temperature, conditions and the subsequent stirring after all the glycide was in were identical with those described in Example 1a, preceding.

*Example 3a*

The same procedure was followed as in Examples 1a and 2a, preceding, except that the polypropylene glycol used was one having a molecular weight of 2750. The amount employed was 1375 grams. The amount of catalyst employed (sodium methylate) was 14 grams. The amount of glycide employed was identically the same as in Examples 1a and 2a, preceding. The time factor and temperature were the same as in Examples 1a and 2a, preceding. The heating period after all the glycide was in was the same as in Examples 1a and 2a, preceding. In this instance, however, the glass reaction pot had a capacity of 2 liters instead of 1½ liters.

The tetralols resulting from the above procedures were slightly off-color compared with the original polypropylene glycol. A slight change to a faint yellowish cast appeared during the reaction with glycide. The final product, of course, had a slightly alkaline reaction due to the presence of sodium methylate and this would have been the case also if some other catalyst, such as caustic soda, had been used.

These tetralols could, of course, be bleached in the usual manner with a bleaching clay, a filtering char, or the like. For the purpose of producing the demulsifier this was immaterial. The viscosity of the liquids were somewhat higher than that of the initial diols from which they were obtained. These products, i. e., tetralols, were water-insoluble and kerosene-soluble.

PART 2

As previously pointed out the present invention is concerned with acidic esters obtained from tetralols described in Part 1, preceding, and polycarboxy acids, particularly dicarboxy acids such as adipic acid, phthalic acid, or anhydride, succinic acid, diglycollic acid, sebacic acid, azelaic acid, aconitic acid, maleic acid or anhydride, citraconic acid or anhydride, maleic acid or anhydride adducts as obtained by the Diels-Alder reaction from products such as maleic anhydride, and cyclopentadiene. Such acids should be heat stable so they are not decomposed during esterification. They may contain as many as 36 carbon atoms as, for example, the acids obtained by dimerization of unsaturated fatty acids, unsaturated monocarboxy fatty acids, or unsaturated monocarboxy acids having 18 carbon atoms. Reference to the acid in the hereto appended claims obviously includes the anhydrides or any other obvious equivalents. My preference, however, is to use polycarboxy acids having not over 8 carbon atoms.

The production of esters including acid esters (fractional esters) from polycarboxy acids and glycols or other hydroxylated compounds is well known. Needless to say, various compounds may be used such as the low molal ester, the anhydride, the acyl chloride, etc. However, for purpose of economy it is customary to use either the acid or the anhydride. A conventional procedure is employed. On a laboratory scale one can employ a resin pot of the kind described in U. S. Patent No. 2,499,370, dated March 7, 1950 to De Groote and Keiser, and particularly with one more opening to permit the use of a porous spreader if hydrochloric acid gas is to be used as a catalyst. Such device or absorption spreader consists of minute Alundum thimbles which are connected to a glass tube. One can add a sulfonic acid such as para-toluene sulfonic acid as a catalyst. There is some objection to this because in some instances there is some evidence that this acid catalyst tends to decompose or rearrange the oxypropylated compounds, and particularly likely to do so if the esterification temperature is too high. In the case of polycarboxy acids such as diglycollic acid, which is strongly acidic there is no need to add any catalyst. The use of hydrochloric gas has one advantage over para toluene sulfonic acid and that is that at the end of the reaction it can be removed by flushing out with nitrogen, whereas there is no reasonably convenient means available of removing the paratoluene sulfonic acid or other sulfonic acid employed. If hydrochloric acid is employed one need only pass the gas through at an exceedingly slow rate so as to keep the reaction mass acidic. Only a trace of acid need be present. I have employed hydrochloric acid gas or the aqueous acid itself to eliminate the initial basic material. My preference, however, is to use no catalyst whatsoever and to insure complete dryness of the tetralol as described in the text immediately following.

The products obtained in Part 1 preceding may contain a basic catalyst. As a general procedure I have added an amount of half-concentrated hydrochloric acid considerably in excess of what is required to neutralize the residual catalyst. The mixture is shaken thoroughly and allowed to stand overnight. It is then filtered and refluxed with the xylene present until the water can be separated in a phase-separating trap. As soon as the product is substantially free from water the distillation stops. This preliminary step can be carried out in the flask to be used for esterification. If there is any further deposition of sodium chloride during the reflux stage needless to say a second filtration may be required. In any event the neutral or slightly acidic solution of the oxypropylated derivatives described in Part 1 is then diluted further with sufficient xylene, decalin, petroleum solvent, or the like, so that one has obtained approximately a 45% solution. To this solution there is added a polycarboxylated reactant as previously described, such as phthalic anhydride, succinic acid or anhydride, diglycollic acid, etc. The mixture is refluxed until esterification is complete as indicated by elimination of water or drop in carboxyl value. Needless to say, if one produces a half-ester from an anhydride such as phthalic anhydride, no water is eliminated. However, if it is obtained from diglycollic acid, for example, water is eliminated. All such procedures are conventional and have been so thoroughly described in the literature that further consideration will be limited to a few examples and a comprehensive table.

Other procedures for eliminating the basic residual catalyst, if any, can be employed. For example, the oxyalkylation can be conducted in absence of a solvent or the solvent removed after oxypropylation. Such oxypropylation end product can then be acidified with just enough concentrated hydrochloric acid to just neutralize the residual basic catalyst. To this product one can then add a small amount of anhydrous sodium sulfate (sufficient in quantity to take up any water that is present) and then subject the mass to centrifugal force so as to eliminate the sodium sulfate and probably the sodium chloride formed. The clear somewhat viscous straw-colored amber liquid so obtained may contain a small amount of sodium sulfate or sodium chloride but, in any event, is perfectly acceptable for esterification in the manner described.

It is to be pointed out that the products here described are not polyesters in the sense that there is a plurality of both tetralol radicals and acid radicals; the product is characterized by having only one tetralol radical.

In some instances and, in fact, in many instances I have found that in spite of the dehydration methods employed above that a mere trace of water still comes through and that this mere trace of water certainly interferes with the acetyl or hydroxyl value determination, at least when a number of conventional procedures are used and may retard esterification, particularly where there is no sulfonic acid or hydrochloric acid present as a catalyst. Therefore, I have preferred to use the following procedure: I have employed about 200 grams of the tetralol as described in Part 1, preceding; I have added about 60 grams of benzene, and then refluxed this mixture in the glass resin pot using a phase-separating trap until the benzene carried out all the water present as water of solution or the equivalent. Ordinarily this refluxing temperature is apt to be in the neighborhood of 130° to possibly 150° C. When all this water or moisture has been removed I also withdraw approximately 20 grams or a little less benzene and then add the required amount of the carboxy reactant and also about 150 grams of a high boiling aromatic petroleum solvent. These solvents are sold by various oil refineries and, as far as solvent effect act as if they were almost completely aromatic in character. Typical distillation data in the particular type I have employed and found very satisfactory is the following:

| | |
|---|---|
| I. B. P., 142° C. | 50 ml., 242° C. |
| 5 ml., 200° C. | 55 ml., 244° C. |
| 10 ml., 209° C. | 60 ml., 248° C. |
| 15 ml., 215° C. | 65 ml., 252° C. |
| 20 ml., 216° C. | 70 ml., 252° C. |
| 25 ml., 220° C. | 75 ml., 260° C. |
| 30 ml., 225° C. | 80 ml., 264° C. |
| 35 ml., 230° C. | 85 ml., 270° C. |
| 40 ml., 234° C. | 90 ml., 280° C. |
| 45 ml., 237° C. | 95 ml., 307° C. |

After this material is added, refluxing is continued and, of course, is at a higher temperature, to wit, about 160° to 170° C. If the carboxy reactant is an anhydride needless to say no water of reaction appears; if the carboxy reactant is an acid water of reaction should appear and should be eliminated at the above reaction temperature. If it is not eliminated I simply separate out another 10 or 20 cc. of benzene by means of the phase-separating trap and thus raise the temperature to 180° or 190° C., or even to 200° C., if need be. My preference is not to go above 200° C.

The use of such solvent is extremely satisfactory provided one does not attempt to remove the solvent subsequently except by vacuum distillation and provided there is no objection to a little residue. Actually, when these materials are used for a purpose such as demulsification the solvent might just as well be allowed to remain. If the solvent is to be removed by distillation, and particularly vacuum distillation, then the high boiling aromatic petroleum solvent might well be replaced by some more expensive solvent, such as decalin or an alkylated decalin which has a rather definite or close range boiling point. The removal of the solvent, of course, is purely a conventional procedure and requires no elaboration.

In the appended table Solvent #7-3, which appears in numerous instances, is a mixture of 7 volumes of the aromatic petroleum solvent previously described and 3 volumes of benzene. Reference to Solvent #7 means the particular petroleum solvent previously described in detail. This was used, or a similar mixture, in the manner previously described. A large number of the examples indicated were repeated employing decalin, using this mixture and particularly with the preliminary step of removing all the water. If one does not intend to remove the solvent my preference is to use the petroleum solvent-benzene mixture although obviously any of the other mixtures, such as decalin and xylene, can be employed.

The data included in the subsequent table are self-explanatory, and very complete and it is believed no further elaboration is necessary:

positions are still obscure. Such side reaction products can contribute a substantial proportion of the final cogeneric reaction mixture. Various suggestions have been made as to the nature of these compounds, such as being cyclic polymers of propylene oxide, dehydration products with the appearance of a vinyl radical, or isomers of propylene oxide or derivatives thereof, i. e., of an aldehyde, ketone, or allyl alcohol. In some instances an attempt to react the stoichiometric amount of a polycarboxy acid with the tetralol results in an excess of the carboxylated reactant for the reason that apparently under conditions of reaction less reactive hydroxyl radicals are present than indicated by the hydroxyl value. Under such circumstances there is simply a residue of the carboxylic reactant which can be removed by filtration or, if desired, the esterification procedure can be repeated using an appropriately reduced ratio of carboxylic reactant.

Even the determination of the hydroxyl value by conventional procedure leaves much to be desired due either to the cogeneric materials previously referred to, or for that matter, the presence of any inorganic salts or propylene oxide. Obviously this oxide should be eliminated.

The solvent employed, if any, can be removed from the finished ester by distillation and par-

TABLE I

| Ex. No. of Acid Ester | Ex. No. of Hydroxy Cmpd. | Theo. Mol. Wt. of Tetralol[1] | Amt. of Tetralol (gms.) | Polycarboxy Reactant | Amt. of Polycarboxy Reactant (grs.) | Solvent | Amt. Solvent (grs.) | Max. Esterification Temp., °C. | Time of Esterification (hrs.) | Water Out (cc.) |
|---|---|---|---|---|---|---|---|---|---|---|
| 1b | 1a | 2,173 | 100 | Diglycol Acid. | 24 | #7-3 | 120 | 190 | 15 | 3.0 |
| 2b | 1a | 2,173 | 100 | Phthalic Anhyd. | 26.6 | #7-3 | 125 | 175 | 5 | Nil |
| 3b | 1a | 2,173 | 100 | Maleic Anhyd. | 17.6 | #7-3 | 116 | 170 | 4¾ | Nil |
| 4b | 1a | 2,173 | 100 | Succinic Anhyd. | 18 | #7-3 | 116 | 165 | 4½ | Nil |
| 5b | 1a | 2,173 | 100 | Aconitic Acid. | 32 | #7-3 | 122 | 182 | 4 | 3.0 |

[1] Theoretical molecular weight of tetralol based on hydroxyl value of polypropylene glycol, and assuming complete combination with the glycide.

The procedure for manufacturing the esters has been illustrated by preceding examples. If for any reason reaction does not take place in a manner that is acceptable, attention should be directed to the following details: (a) Recheck the hydroxyl or acetyl value of the tetralol and use a stoichiometrically equivalent amount of acid; (b) if the reaction does not proceed with reasonable speed either raise the temperature indicated or else extend the period of time up to 12 or 16 hours if need be; (c) if necessary, use ½% of paratoluene sulfonic acid or some other acid as a catalyst; (d) if the esterification does not produce a clear product a check should be made to see if an inorganic salt such as sodium chloride or sodium sulfate is not precipitating out. Such salt should be eliminated, at least for exploration experimentation, and can be removed by filtering. Everything else being equal as the size of the molecule increases the reactive hydroxyl radical represents a smaller fraction of the entire molecule and thus more difficulty is involved in obtaining complete esterification.

Even under the most carefully controlled conditions of oxypropylation involving comparatively low temperatures and long time of reaction there are formed certain compounds whose comticularly vacuum distillation. The final products or liquids are generally almost water-white to a very pale straw color, and show moderate viscosity. They can be bleached with bleaching clays, filtering chars, and the like. However, for the purpose of demulsification or the like color is not a factor and decolorization is not justified.

In the above instance I have permitted the solvents to remain present in the final reaction mass. In other instances I have followed the same procedure using decalin or a mixture of decalin or benzene in the same manner and ultimately removed all the solvents by vacuum distillation.

PART 3

In the hereto appended claims the demulsifying agent is described as an acidic ester obtained from a material having 4 hydroxyl radicals. The tetralol used to produce the ester is, in turn, obtained from a polypropylene glycol.

Oxypropylation is obviously involved in the preparation of high molal polypropylene glycols of the kind herein employed as raw materials. Propylene glycol has a secondary alcoholic radical and a primary alcohol radical. Obviously then polypropylene glycols could be obtained, at least theoretically, in which two secondary alcoholic groups are united or a secondary alcohol group is united to a primary alcohol group, etherization being involved, of course, in each instance. Needless to say, the same situation applies when one reacts such glycols to produce polyhydric materials having 4 or more hydroxyls.

As was previously noted, polypropylene glycols are obtained by the oxypropylation of water or propylene glycol, or the equivalent. The usual method is to oxypropylate propylene glycol, or dipropylene glycol for that matter. Usually no effort is made to differentiate between oxypropylation taking place, for example, at the primary alcohol unit radical or the secondary alcohol radical. Actually, when such products are obtained, such as a high molal polypropylene glycol or the products obtained in the manner herein described one does not obtain a single derivative such as $HO(RO)_nH$ or $—(RO)_nH$ in which $n$ has one and only one value, for instance, 14, 15 or 16, or the like. Rather, one obtains a cogeneric mixture of closely related or touching homologues. These materials invariably have high molecular weights and cannot be separated from one another by any known procedure without decomposition. The properties of such mixture represent the contribution of the various individual members of the mixture. On a statistical basis, of course, $n$ can be appropriately specified. For practical purposes one need only consider the oxypropylation of a monohydric alcohol because in essence this is substantially the mechanism involved. Even in such instances where one is concerned with a monohydric reactant one cannot draw a single formula and say that by following such procedure one can readily obtain 80% or 90% or 100% of such compound. However, in the case of at least monohydric initial reactants one can readily draw the formulas of a large number of compounds which appear in some of the probable mixtures or can be prepared as components and mixtures which are manufactured conventionally.

Simply by way of illustration reference is made to the copending application of De Groote, Wirtel and Pettingill, Serial No. 109,791, filed August 11, 1949 (now Patent 2,549,434, granted April 17, 1951).

However, momentarily referring again to a monohydric initial reactant it is obvious that if one selects any such simple hydroxylated compound and subjects such compound to oxyalkylation, such as oxyethylation, or oxypropylation, it becomes obvious that one is really producing a polymer of the alkylene oxides except for the terminal group. This is particularly true where the amount of oxide added is comparatively large, for instance, 10, 20, 30, 40, or 50 units. If such compound is subjected to oxyethylation so as to introduce 30 units of ethylene oxide, it is well known that one does not obtain a single constituent which, for the sake of convenience, may be indicated as $RO(C_2H_4O)_{30}H$. Instead, one obtains a cogeneric mixture of closely related homologues, in which the formula may be shown as the following, $RO(C_2H_4O)_nH$, wherein $n$, as far as the statistical average goes, is 30, but the individual members present in significant amount may vary from instances where $n$ has a value of 25, and perhaps less, to a point where $n$ may represent 35 or more. Such mixture is, as stated, a cogeneric closely related series of touching homologous compounds. Considerable investigation has been made in regard to the distribution curves for linear polymers. Attention is directed to the article entitled "Fundamental Principles of Condensation Polymerization," by Flory, which appeared in Chemical Reviews, volume 39, No. 1, page 137.

Unfortunately, as has been pointed out by Flory and other investigators, there is no satisfactory method, based on either experimental or mathematical examination, of indicating the exact proportion of the various members of touching homologous series which appear in cogeneric condensation products of the kind described. This means from the practical standpoint, i. e., the ability to describe how to make the product under consideration and how to repeat such production time after time without difficulty, it is necessary to resort to some other method of description, or else consider the value of $n$, in formulas such as those which have appeared previously and which appear in the claims, as representing both individual constituents in which $n$ has a single definite value, and also with the understanding that $n$ represents the average statistical value based on the assumption of completeness of reaction.

As far as the polypropylene glycol is concerned, as previously stated, one could start with water or propylene glycol and react the product with 12 to 100 moles of propylene oxide in order to have a suitable reactant for combination with glycide. Assume in a particular example that a combination takes place so that 15 moles of propylene oxide are used for an initial mole of water. In a generic formula for a propylene glycol, such as $HO(RO)_nH$ previously employed, $n$ can vary as noted and might be 15, 20, 30, 40 or more. Referring to a specific case where 15 moles of propylene oxide are combined with one mole of water to give a polypropylene glycol actually one obtains products in which $n$ probably varies from 10 to 20, perhaps even further. The average value, however, is 15, assuming, as previously stated, that the reaction is complete. The product described by the formula is best described by a suitable formula which includes various isomers without differentiation or also in terms of method of manufacture.

The significant fact is in regard to the glycerol or glycide ethers of the polypropylene glycols herein specified that although they are obtained from initial products which are water-soluble, i. e., water, propylene glycol or the like, yet these tetralols prior to esterification are water-insoluble and kerosene-soluble. Needless to say, treatment of any chemical compound with 1, 2 or 3 moles of glycide tends to increase water-solubility and decrease kerosene-solubility. Incidentally, too, the initial products prior to oxypropylation are not xylene-soluble, that is, water and propylene glycol are not xylene-soluble, but the final products are. When polypropylene glycols of comparatively low molecular weight, about 700, are employed, they produce tetralols which sometimes may tend to emulsify or disperse somewhat in water because some of the constituents, being a cogeneric mixture, are water-soluble but the bulk are water-insoluble. Thus in the low molecular weight tetralols one may have some emulsification or dispersibility in water, as noted. This is not true, however, in my preferred range, i. e., 1750 to 2750. I have found these particular tetralols to be most desirable for preparing the ester.

Going back to what has been said previously in the introductory part it will be noted that one may have variations in regard to how the glycide combines to form the tetralol. Thus, the formula as herein employed and particularly the claims, must be interpreted in light of the facts previously indicated namely (a) there may be a considerable variation in the structure of a polypropylene glycol as to whether one has a head-to-tail structure, a tail-to-tail structure, or a head-to-head structure, or other variations; (b) variation will take place in the total range, for example, in an instance where $n$ might statistically average 40 the actual variation of $n$ might run from 20 to 60, and (c) the manner in which the glycide combines to produce a tetralol may vary also as has been pointed out. These facts must be considered in the descriptions herein employed, both in the specification and in the claims. For obvious reasons no better characterization is available.

PART 4

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentration. This same fact is true in regard to the material or materials employed as the demulsifying agent of my process.

In practicing my process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch treatment type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and reintroduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation.

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels to 2000 barrels capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of the product of Example 2b with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 2b, 20%;

A cyclohexylamine salt of a polypropylated naphthalene monosulfonic acid, 24%;

An ammonium salt of a polypropylated naphthalene mono-sulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

PART 5

Previous reference has been made to oxyalkylated agents other than propylene oxide and glycide, for example, ethylene oxide and butylene oxide. Obviously variants can be prepared, which do not depart from what has been said herein, to produce compounds of the described structure. The tetralols could be treated with one or more moles of ethylene oxide to yield a product in which water-solubility and kerosene-solubility have not been particularly affected. Such tetralol could then be combined to give the acidic fractional ester corresponding to those herein described. The molecular weight range of the tetralol would obviously be within the described limits. Instead of ethylene oxide one might employ butylene oxide. In such variations other comparable ones can be employed without departing from the spirit of the invention.

Incidentally, the polyhydroxylated materials described in Part 1 can be treated with various reactants such as epichlorohydrin, dimethyl sulfate, sulfuric acid, ethylene imine, etc., to give new intermediate of obvious value for organic synthesis. If treated with epichlorohydrin or monochloracetic acid the resultant product can be further reacted with a tertiary amine, such as pyridine, or the like, to give ammonium compounds. If treated with maleic anhydride to give a total ester the resultant can be treated with sodium bisulfite to yield a sulfosuccinate. Sulfo groups can be introduced also by means of a sulfating agent as previously suggested, or by treating the chloroacetic acid resultant with sodium sulfite.

I have found that if such hydroxylated compound or compounds are reacted further so as to produce entirely new derivatives, such new derivatives have the properties of the original hydroxylated compound to some degree and yet in other ways are markedly different. This is especially true insofar that they are effective and valuable demulsifying agents in many instances for resolution of water-in-oil emulsions as found in the petroleum industry, as break-inducers in doctor treatment of sour crude, etc.

Having thus described my invention, what I claim as new and desire to secure by Letters Patent, is:

1. A process for breaking petroleum emulsions of the water-in-oil type characterized by subjecting the emulsion to the action of a demulsifier including hydrophile synthetic products; said hydrophile synthetic products being characterized by the formula

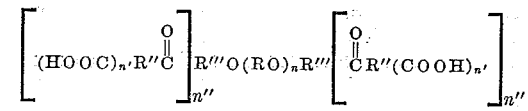

in which $R'''O(RO)_nR'''$ is a tetravalent radical obtained by the elimination of the hydroxyl hydrogen atoms from the tetralol $R'O(RO)_nR'$ in which $R'$ is a monovalent radical selected from the class consisting of hydrogen,

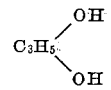

and

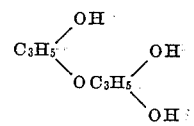

and $(RO)_n$ is the divalent radical of a polypropylene glycol of the structure $HO(RO)_nH$, with the proviso that $n$ be a whole number so selected, that the polypropylene glycol be within the approximate molecular weight range of 750 to 5,000; $n'$ is a whole number not greater than 2, and $n''$ is a whole number varying from 1 to 3 with the limitation that the sum of $n'$ plus $n''$ be 4; and $R''$ is the radical of the polycarboxy acid

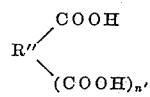

with the further proviso that the parent tetralol prior to esterification be water-insoluble and kerosene-soluble.

2. A process for breaking petroleum emulsions of the water-in-oil type characterized by subjecting the emulsion to the action of a demulsifier including hydrophile synthetic products; said hydrophile synthetic products being characterized by the formula

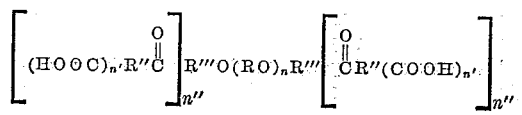

in which R'''O(RO)$_n$R''' is a tetravalent radical obtained by the elimination of the hydroxyl hydrogen atoms from the tetralol R'O(RO)$_n$R' in which R' is a monovalent radical selected from the class consisting of hydrogen,

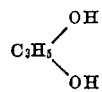

and

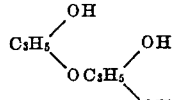

and (RO)$_n$ is the divalent radical of a polypropylene glycol of the structure HO(RO)$_n$H, with the proviso that $n$ be a whole number so selected, that the polypropylene glycol be within the approximate molecular weight range of 1750 to 2750; $n$ is a whole number not greater than 2, and $n''$ is a whole number varying from 1 to 3 with the limitation that the sum of $n''$ plus $n''$ be 4; and R'' is the radical of the polycarboxy acid

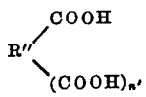

with the further proviso that the parent tetralol prior to esterification be water-insoluble and kerosene-soluble.

3. A process for breaking petroleum emulsions of the water-in-oil type characterized by subjecting the emulsion to the action of a demulsifier including hydrophile synthetic products; said hydrophile synthetic products being characterized by the formula

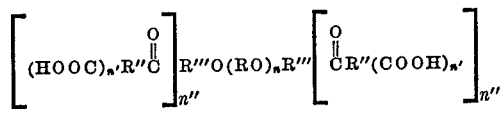

in which R'''O(RO)$_n$R''' is a tetravalent radical obtained by the elimination of the hydroxyl hydrogen atoms from the tetralol R'O(RO)$_n$R' in which R' is a monovalent radical selected from the class consisting of hydrogen,

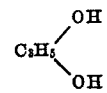

and

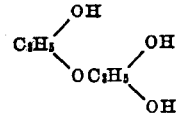

and (RO)$_n$ is the divalent radical of a polypropylene glycol of the structure HO(RO)$_n$H, with the proviso that $n$ be a whole number so selected, that the polypropylene glycol be within the approximate molecular range of 1750 to 2750; $n$ is a whole number not greater than 2, and $n''$ is a whole number varying from 1 to 3 with the limitation that the sum of $n''$ plus $n''$ be 4; and R'' is the radical of the polycarboxy acid

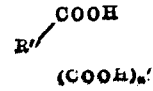

having not over 8 carbon atoms; and with the further proviso that the parent tetralol prior to esterification be water-insoluble and kerosene-soluble.

4. A process for breaking petroleum emulsions of the water-in-oil type characterized by subjecting the emulsion to the action of a demulsifier including hydrophile synthetic products; said hydrophile synthetic products being characterized by the formula

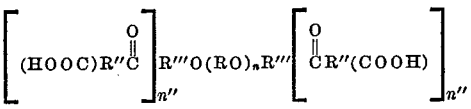

in which R'''O(RO)$_n$R''' is a tetravalent radical obtained by the elimination of the hydroxyl hydrogen atom from the tetralol R'O(RO)$_n$R' in which R' is a monovalent radical selected from the class consisting of hydrogen,

and

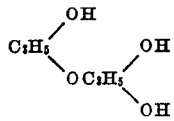

and (RO)$_n$ is the divalent radical of a polypropylene glycol of the structure HO(RO)$_n$H, with the proviso that $n$ be a whole number so selected, that the polypropylene glycol be within the approximate molecular weight range of 1750 to 2750; $n''$ is a whole number varying from 1 to 3 with the limitation that the sum of $n''$ plus $n''$ be 4; and R'' is the radical of the dicarboxy acid

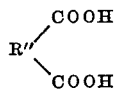

having not over 8 carbon atoms; and with the further proviso that the parent tetralol prior to esterification be water-insoluble and kerosene-soluble.

5. The process of claim 4 wherein the dicarboxy acid is diglycollic acid.
6. The process of claim 4 wherein the dicarboxy acid is phthalic acid.
7. The process of claim 4 wherein the dicarboxy acid is maleic acid.
8. The process of claim 4 wherein the dicarboxy acid is succinic acid.
9. The process of claim 4 wherein the dicarboxy acid is citraconic acid.

MELVIN DE GROOTE.

REFERENCES CITED

The following references are of record in the file of this patent:

UNITED STATES PATENTS

| Number | Name | Date |
| --- | --- | --- |
| 2,552,528 | De Groote | May 15, 1951 |
| 2,562,878 | Blair | Aug. 7, 1951 |